Dec. 1, 1970   J. J. KOWALIK ET AL   3,543,488
APPARATUS FOR PLANT CROP CURING BY FLAMING
Filed April 17, 1967   3 Sheets-Sheet 1
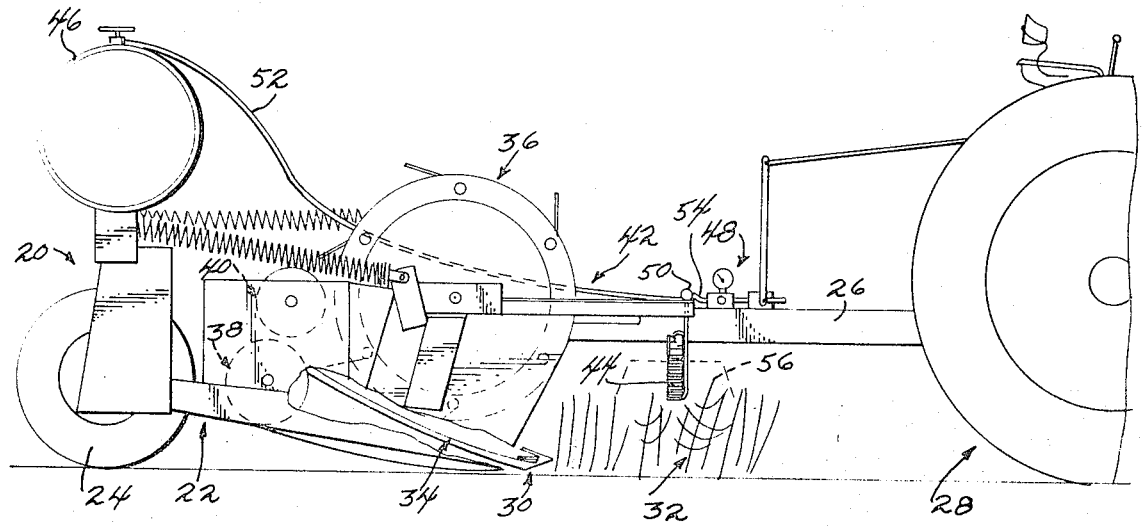
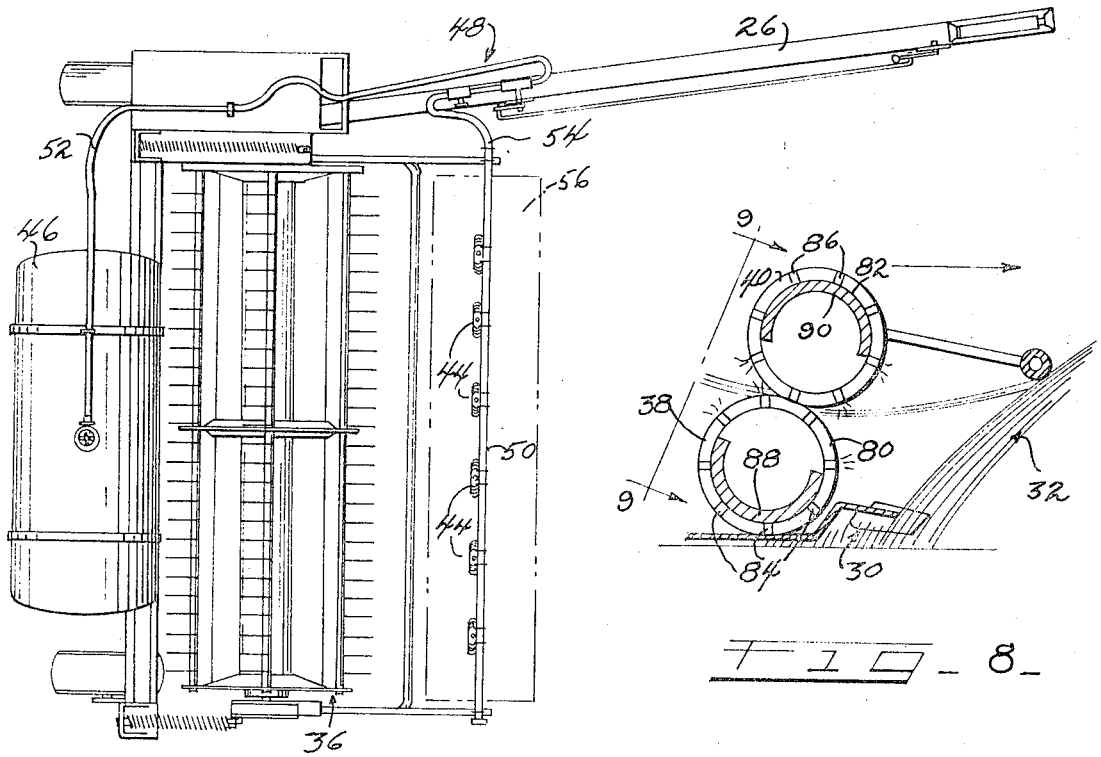
INVENTORS
JOHN J. KOWALIK
EDWARD SVEREIKA
HAROLD G. MEITL

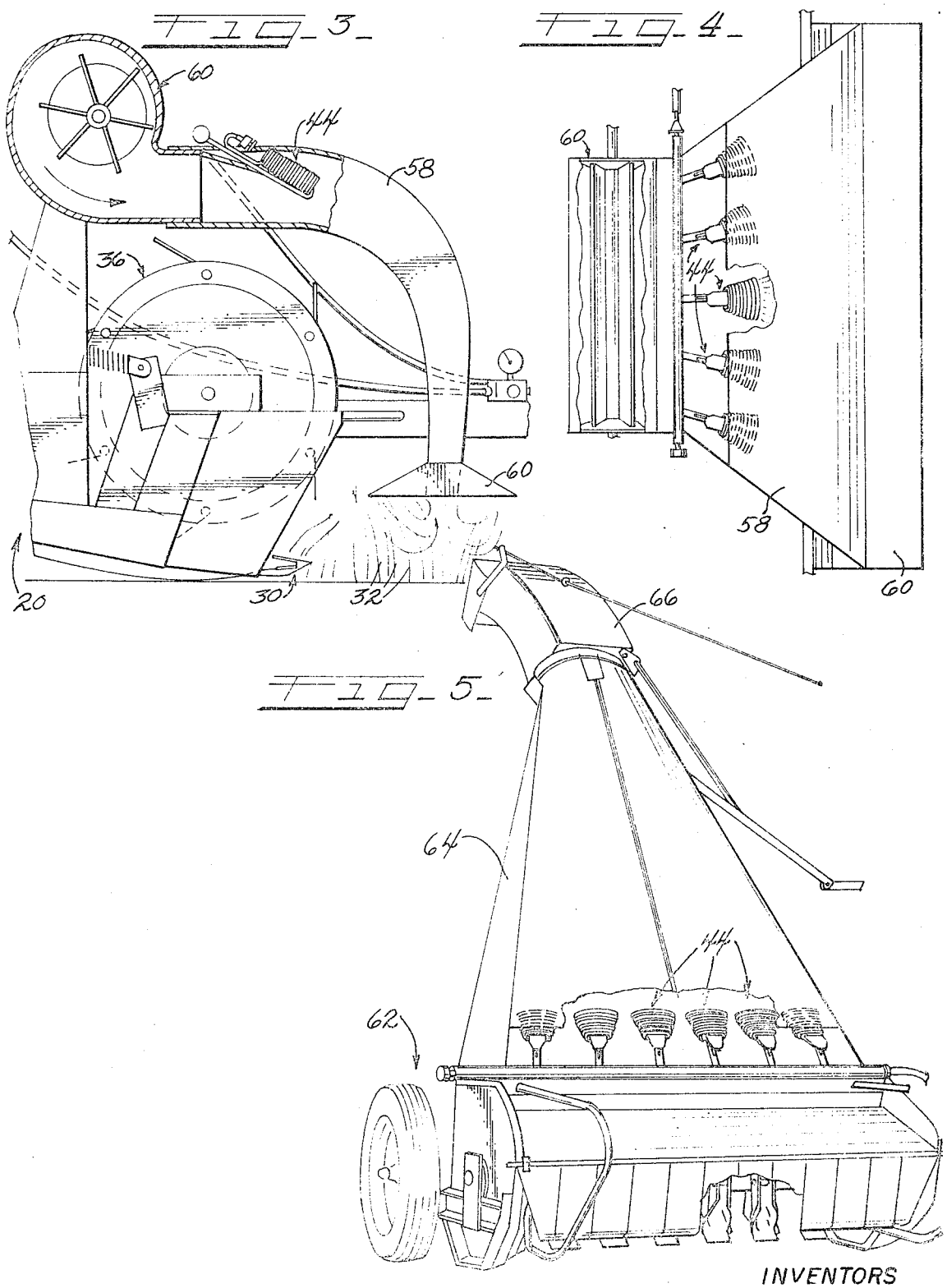

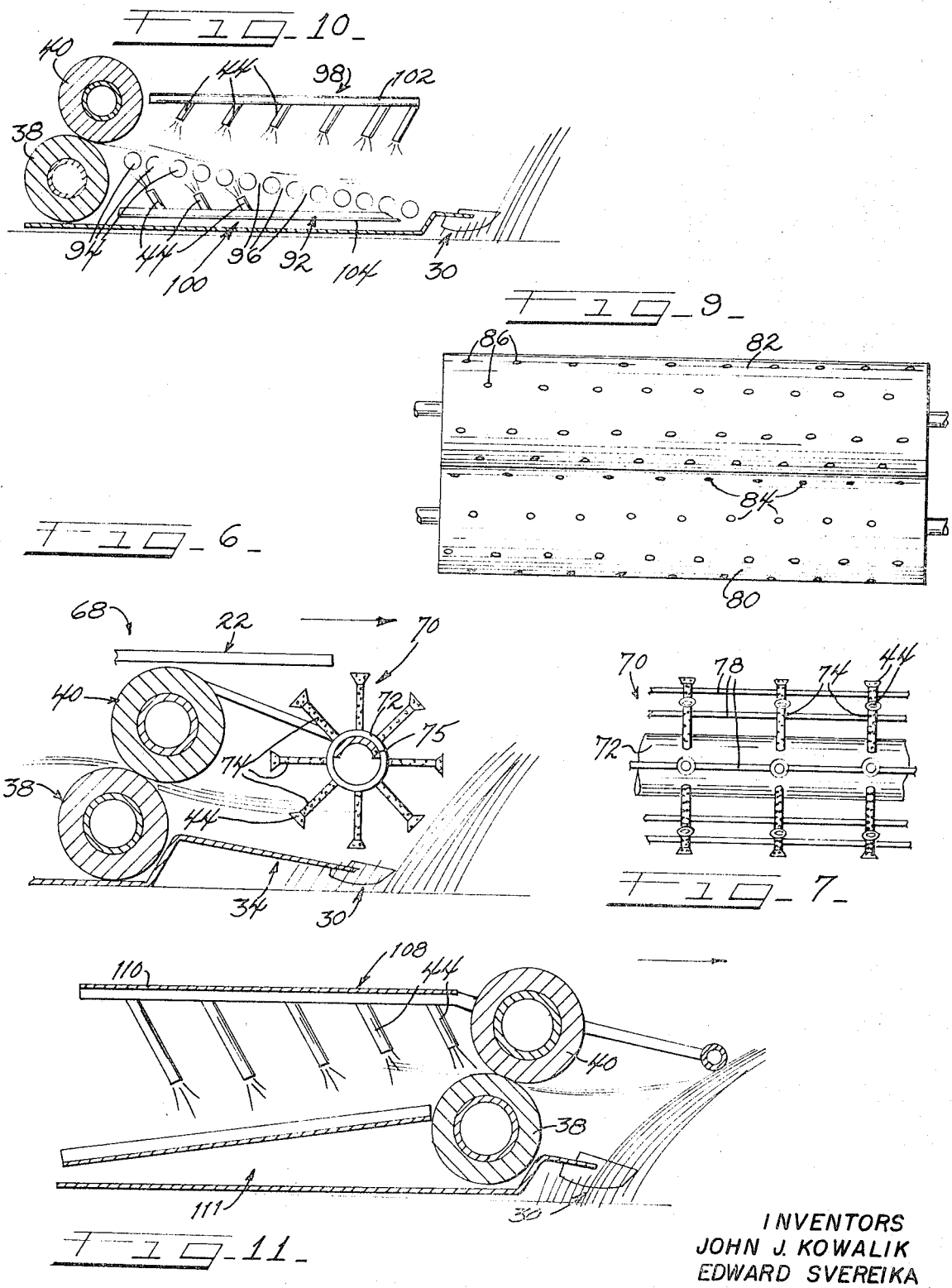

United States Patent Office 3,543,488
Patented Dec. 1, 1970

3,543,488
APPARATUS FOR PLANT CROP CURING BY FLAMING
John J. Kowalik, Glenview, Edward Svereika, Chicago, and Harold G. Meitl, Clarendon Hills, Ill., assignors to International Harvester Company, Chicago, Ill., a corporation of Delaware
Filed Apr. 17, 1967, Ser. No. 631,360
Int. Cl. A01d 43/10
U.S. Cl. 56—23         5 Claims

ABSTRACT OF THE DISCLOSURE

Applying flame to plants in the cutting operation, either immediately before cutting while they are standing, or immediately after cutting, for sweating out the moisture from the plants or conditioning plants to release moisture and destroying pests such as aphids which in recent years have caused serious crop losses and for curing and preserving purposes.

BACKGROUND OF THE INVENTION

Field of the invention

The invention has to do with cutting crops, such as hay and similar crops, in the field, and curing the crops upon cutting them, preparatory to gathering and storing them. The stalks and the leaves of the crop plants normally do not cure at the same rate because of the difference in thickness of massiveness. It has long been a problem to produce a curing effect so that both portions would cure at more nearly the same rate. Due to the thinness of the leaves for example, they cure at a rapid rate and much before the heavier stalks and if the plants are subjected to a continuing curing process so as to fully cure the stalks, then the leaves, which are most nutritive, would be overcured, or become too dried and brush off the plant. Heretofore, a common method of effecting a more uniform curing operation has been to crush the stalks so as to render them less massive and expose large surface areas to the air to cure at a much faster rate and at a rate more nearly that of the leaves. In the crushing operation the stalks are broken open, exposing the interior, enabling the liquids to escape, and rendering the stalks thinner, hastening the curing thereof. The present invention is directed to the application of flaming the stalks for hastening the curing thereof, rather than crushing them, although crushing may be utilized as well.

DESCRIPTION OF THE PRIOR ART

There is no known prior art disclosing the broad idea of flaming to plants in the cutting operation in which the flame is applied to the standing plants.

SUMMARY OF THE INVENTION

The flaming greatly accelerates the curing of the crops, while producing other advantages not present when the plant stalks are merely sun cured. One of the advantages we have found in the application of heat, or flaming, is that it preserves carotene in the plant by rendering it more stable. Cells which release enzymes are deactivated reducing carotene losses. Plant respiration is halted reducing the 5–15% dry matter losses which occur in normal field drying.

According to the present invention the flame is applied directly to the plants, or in the immediate neighborhood thereof. This action opens and sets the stomata or pores in the plants and enables the evaporation of the moisture from within the plants more rapidly. The stomata or pores normally close in the neighborhood of three hours after cutting, but in the exercise of the present invention these stomata or pores, becoming set, remain open until the plants are fully cured. This application of flaming has further advantages in that it preserves nutrients lost by respiration after cutting, it minimizes damage caused by rain and heavy dew, and more moisture, or water, is removed from the plant stalks when they are crushed.

In accordance with a principal feature of the invention, the flaming is done to the plants while they are still standing, so that the flaming, or application of heat, is distributed as fully as possible entirely around the plant stalks, since the stalks are separated and spaced apart while standing. In one form of the invention, the flaming is applied more intensely at the base of the stalks which usually is the largest part, resulting in greatest efficiency, and a general correlation of application of the flaming to the size of the stalks.

Other features of the invention include novel apparatus and method for flaming the plant stalks after being cut, and utilizes a novel arrangement for effectively applying the flaming notwithstanding the fact that the plants are piled and generally matted after being cut.

Additional features include flaming the plant stalks after they are crushed, whereby to more effectively produce a searing action thereon, and evaporation of the moisture from the interior of the stalks.

A preferred form of the invention is in applying flame to the standing plants immediately before cutting whereby utilizing the separation of the individual plants to obtain optimum flame penetration into the crops so as to momentarily encompass the entire plant.

Other objects and advantages of the invention will appear from the following detail description taken in conjunction with the accompanying drawings.

BRIEF DESCRIPTION OF THE DRAWINGS

FIG. 1 is a side elevational view of an implement, in this case a mower-conditioner, to which the invention is applied, this view also showing a portion of a tractor drawing the implement;

FIG. 2 is a plan view of the implement of FIG. 1;

FIG. 3 is a fragmentary view of an implement similar to that shown in FIGS. 1 and 2, but with a different form of apparatus of the invention applied thereto;

FIG. 4 is a fragmentary plan view of the principal portion of the apparatus shown in FIG. 3;

FIG. 5 is a fragmentary perspective view showing a modified form of the invention;

FIG. 6 is a fragmentary vertical longitudinal view, semi-diagrammatic in form, showing another form of the invention;

FIG. 7 is a fragmentary view taken at line 7—7 of FIG. 6;

FIG. 8 is a fragmentary vertical longitudinal view, semi-diagrammatic in nature, of another form of apparatus;

FIG. 9 is a view taken at line 9—9 of FIG. 8;

FIG. 10 is a fragmentary vertical longitudinal view, semi-diagrammatic in nature, of a still further embodiment of the invention; and FIG. 11 is a fragmentary vertical longitudinal view, semi-diagrammatic in nature, of still another embodiment of the invention.

DESCRIPTION OF THE PREFERRED EMBODIMENTS

Referring now in detail to the accompanying drawings, attention is directed first to FIGS. 1 and 2 showing a preferred form of apparatus and representing a preferred method of the invention. In these figures an implement 20 is representative of various kinds of implements to which the invention may be applied. The implement 20 in the present instance is a power-conditioner, utilized for mowing plants such as hay and for conditioning those plants as by crushing the stalks thereof. The implement includes a suitable frame 22 having supporting wheels 24 and a tongue 26 by which the implement is connected with a draft vehicle such as a tractor 28. The vehicle includes a cutter 30 which may be reciprocating sickle extending across the implement for cutting the crop plants, here indicated at 32. The crop plants upon being cut fall onto a conveyor or platform 34 and are conveyed, or assisted in being conveyed, by a reel 36 to a pair of crusher rollers 38, 40. These crusher rollers crush the stalks of the plants and the plants then fall behind and are deposited on the ground in a windrow. The implement, as just described, may be of any known or suitable kind and need not be described further in detail.

The apparatus incorporating a main feature of the invention is indicated in its entirety at 42 and in the present embodiment as represented in FIGS. 1 and 2, includes a plurality of burners 44, a fuel supply tank 46 and a control means 48 including a regulating valve. For convenience, LP gas may be used, but the invention is applicable to other kinds of fuel as well. The burners 44 may be of any suitable type and are mounted on a header 50 extending across the implement throughout a range substantially the length of the cutter 30 and thus across the swath to be cut. The header 50 may be in the form of a pipe serving both as a support for the burners and a manifold for supplying the fuel. The fuel is conducted from the tank 46 through a conduit 52 to the control unit 48 and then through another conduit 54 to the header 50. Upon proper manipulation and setting of the control unit 48 and ignition of the fuel issuing from the burners, the flame from the burners is directed downwardly. These burners are thus arranged for directing the flame onto the plants ahead of the cutter 30 where they are still standing and with the stalks correspondingly spaced apart substantially throughout their height.

The burners may be mounted on suitable means for adjustably positioning them at different heights relative to the ground. They may be positioned entirely above the plants, as in the case of a small plant as represented in FIG. 1, or in the case of a taller plant, they may extend down beyond the tops of the plants and beyond the leaves, closer to the heavier portions of the stalks. In this manner, the greater intensity of the flame is directed onto the heavier portions of the stalks where it is desired. Additionally, the heat from the flame, and possibly the flame itself, is reflected from the ground and more intense heat is applied in this manner to the heavier portions of the stalks at the bottom. The burners may be provided in such numbers and distributed over such an area as desired according to the amount of heat required. Also, the burners may be flared laterally for directing the flame laterally so as to provide an effectively continuous sheet of flaming particularly at the lower most portions at the ground. It may be desired also to provide a reflecting plate or shield 56 generally over the burners and operative for reflecting the heat from the flame downwardly onto the plants. This shield, while not necessary or essential provides a substantial degree of reflection and confinement for concentrating the heat of the burners onto the plants and particularly the lower portions thereof.

The construction of FIGS. 1 and 2 and the method employed, result in particular effective flaming of the stalks since the stalks are separated and spaced apart, due to their standing condition, and as a result the flaming takes effect individually on each stalk and substantially entirely thereabout.

The temperatures involved in the immediate areas of the flame, and as impinging directly on the plant stalks, are generally around 1000° F. and higher. The exact temperatures are not critical, however, and a wide range of such temperatures is permissible with good effect but for optimum action should be of such temperature and duration on the plant so as to inactivate the live material.

Flaming of the plants causes blanching thereof and in the process the stomata or pores as referred to above are opened and set in open position so that they do not close in the later stages of the curing phase. For most effective flaming, the flame should impinge directly on the individual stalks to as great extent as possible. It has always been an object in harvesting hay crops that the curing cycle be reduced to a practical minimum, and in order for the heavier portion of the plants, namely the lower thicker stalk portions, cure as rapidly as the upper portions, it has been necessary to treat the lower portions in some manner, which in the past has been most commonly by crushing. This splits open the stalks and exposes the interior, enabling the escape of moisture. The flaming of the present invention provides an additional curing effect, the heat from the flame opens the stomata and sets them in such open position as stated, and they do not later close during the curing stage, but which remain open in the neighborhood of three to four hours after cutting, thus enabling the continuing escape of moisture and hastening the curing operation. It has been found that the flaming and cutting in close relationship produces an unusual curing effect, reducing the period of curing of the stalks, whereby the stalks, even in the case where they were originally of substantial thickness, now cure in a period of time similar to that required for the smaller portions and the thinner leaves. In this connection the intensification of the flame on the plant stalks adjacent the ground is of particular significance in splitting open those portions of the plants for enabling more rapid curring thereof, and rendering more uniform the curing of the whole plant.

The plants break out into a sweat which protects the plants from burning, the very short period of time in which the flame is directed onto the plant being insufficient to cause incineration of the plant. It has been found that the flaming step also results in a superior stem crushing and shredding effect when the plants are flamed immediately before the cutting and crushing step as in the operation of the implement illustrated in FIGS. 1 and 2.

It has been found that because of the flaming effect, more moisture is removed from the plants in the crushing operation and less solid matter is lost in the moisture and liquids that are squeezed out of the plants. It has also been found that protein coagulation occurs which causes entrapment of cell inclusions. The cells which activate the enzymes are killed, reducing carotene losses and rendering it more stable. The heat from the flame causes the protein to gel, which frees the water from the colloidal suspension. The water as a free-flowing liquid can pass through the cell walls more readily to speed up evaporation. Sweating the plants while they are unwilted, i.e., before being cut, produces a rapid curing effect. The flaming or heating speeds sun drying by increasing the rate of water loss. The curing process preserves nutrients formerly lost by transpiration after cutting. The water in the plants is brought to the boiling point which hastens evaporation.

Attention is next directed to FIGS. 3 and 4 showing a modified version of the invention. The same basic implement 20 is utilized but instead of having the burners arranged for impinging the flame directly onto the plants, they are positioned for heating a stream of air which itself is directed onto the plants. In the present instance, the burners 44 are disposed in a duct 58 which conducts a stream of air developed by a blower 60 in its upper portion, the stream passing by the burners and down through the duct which diverges laterally to cover the transverse area covered by the cutter bar. The burners in this case heat the air stream in the duct and the latter then is directed down onto and into the plants in the same manner described above in connection with the first embodiment, except that in the present case, instead of the flame impinging directly onto the plants, the heated gases are blown into the plants. The air stream is heated sufficiently for searing the plants to open the stomata and pores in the manner described above in connection with the open flame. If desired, a shield 60 may be provided for confining the heat of the air stream as it issues from the duct and flows into the plants.

Attention is next directed to FIG. 5 which shows an implement 62 somewhat different from the previous implement 20, but similar thereto in the fact it cuts hay crop plants and delivers them to the rear, in this case into a receptacle. Suitable means (not shown) is included in the implement for driving or impelling or blowing the cut crops through a hood or similar enclosure or channel 64, from which the cut plants progress through a spout 66 into a suitable receptacle. This implement is of known kind and does not in itself enter into the present invention except that the application of the heat from the apparatus of the present invention is directed into the channel or hood 64 in the progress of the cut plants therethrough. In this case, the burners 44 are disposed in the hood 64 and are directed upwardly or "down stream" relative to the progress of the cut plants therethrough. The cut plants in passing therethrough are subjected to the heated air stream produced by the burners 44, the plants being subjected to various turning and tumbling movements so that the heated air and gases are enabled to penetrate into and pass through the plants to produce the searing effect.

FIGS. 6 and 7 show another form of apparatus for applying heat to the crop plants. In this arrangement, the implement indicated diagrammatically at 68 may be the same or as comparable to the implement 20 of the first embodiment and includes a frame 22, a cutter 30, and a conveyor or platform 34. Rearwardly of the conveyor or platform is the pair of crusher rollers 38, 40. Instead of the burners as arranged in the foregoing embodiments, a burner 70 is provided which is the form of a reel performing the function of deflecting the cut plants rearwardly similarly to reels in implements heretofore used, but which additionally provides a burner construction for impinging flame onto the plants. The reel 70 in the present instance includes a core 72 which is in the form of a tube or pipe 72 from which extend a plurality of radial tubes 74 having on their outer ends burners 44 of a suitable kind, such for example as the kind referred to above. The tube or pipe 72 serves as the support for the burner tubes 74, and as a header or manifold for providing gases to the burner tubes. The tube or pipe 72 is mounted in a suitable manner in the frame 22 for rotation and provided with means for driving by a suitable driving means (not shown). This tube or pipe 72 receives the combustion gases from the conduit 52 in a suitable manner, while the burner tubes 70 communicate with the interior of the tube 72, and in the interior of the tube 72 is a valve member 75 which is cylindrical in shape and extends in the neighborhood of a semi-cylindrical. The valve member 75 shuts off the burner tubes 74 in the upper portion of the reel while enabling the gases in the header tube 72 to pass into the burner tubes in the lower portion of the reel. The burner tubes 72 are provided with a plurality of side apertures 76 in addition to the end apertures through the burners 44.

Any specific construction as desired may be utilized for driving the reel, and preferably the reel is located at such position vertically that the burners 44 reach close to the ground in the rotation of the reel. The burners, or burner tubes 74, are positioned sufficiently close together that the flame issuing from the jets therein reaches substantially all of the plant stalks and at substantially all of the points therearound. In the present instance, the flame directed downwardly impinges on the ground and a substantial portion thereof is reflected with consequent enhanced heating effect on the plants. Preferably the speed of rotation of the reel is such that its peripheral speed is similar to the linear speed of movement of the vehicle so that the lower ends of the burners do not sweep across the ground but remain effectively stationary relative to the point on the ground at which they are directed. The burner tubes 74 are provided with axially extending interconnecting rods or plates 78 operative for engaging the plants and deflecting them rearwardly onto the conveyor or platform 34. The reel burner 70 is preferably positioned so that the burners 44 in receding from the lower portion of the plants, i.e., in the left-hand portion as viewed in FIG. 6, are not shut off before the plants are cut by the cutter bar 30 whereby to provide greater effectiveness and efficiency in flaming the plants while they remain standing and are spaced apart and not matted together.

In the present instance, the burner openings or jets 76 in the sides of the burner tubes 74 are disposed at various angles and this fact, together with the constant change of the direction of the flame issuing therefrom in the rotation of the reel, effectively directs the flame onto each individual plant, stalk and substantially at all points therearound and throughout a great length linearly of the stalks, it being understood that the more uniformly distributed over the area of the stalks that the flaming is done, the more effective will be the results thereof.

The crusher rollers 38 and 40 themselves may be utilized as burners for the flaming or searing operation. Such an arrangement is shown in FIGS. 8 and 9 where the crusher rollers include outer wall elements 80, 82 provided with flame ports or jets 84, 86. The flame is directed through the crusher rollers and out through the jets and it impinges directly onto the stalks of the plants as they are passing between the rollers. If desired, sleeves valves 88, 90 may be provided in the crusher rollers to cut off the mutually outermost apertures as in the case of the reel burner of FIGS. 6, 7. The crusher rollers perform the usual crushing operation, splitting the stalks and the flame impinges directly into the open splits of the stalks, at least in many instances, providing an augmented drying and curing effect.

Attention is next directed to FIG. 10 showing an additional modification of the invention, and one in which the flame is applied to the plants after they are cut, but from both top and bottom. In the present instance, the implement includes a suitable conveyor 92 serving as a platform, posterior to the cutter 30 and onto which the plants when cut are deposited and which carries the plants to the crusher rollers 38, 40. The conveyor 92 may include a plurality of transverse rollers 94 having spaces 96 therebetween, these spaces being relatively small. A stationary platform may be used instead of the conveyor, provided with apertures, or consisting of a plurality of longitudinally extending rods with spaces therebetween, the plants being pushed therealong to the crusher rollers by the oncoming new increments of cut plants. In either case, the burner units 98, 100 are provided above and below the conveyor or platform, having burners 44 which are relatively numerous and being positioned, as they are, both above and below the conveyor or platform, impinge the flame onto substantially all the plant stalks at substantially all points therealong, the spaces between the rollers 94 or other elements accommodating this action. Preferably reflector plates 102, 104 are provided in the burner units for reflecting the heat from the burners against each other and concentrating the heat in the plants traveling along the conveyor. The flame has a further advantage in scouring the rollers of the conveyor and the force of the flame produces gas currents through the spaces 96 which tend to lift the plants from the rollers and aid in the conveyance of the plants by the rollers. The flame being directed onto the plants from both above and below is driven into the spaces between the plants, despite the fact that they are stacked and tend to be matted together, as distinguished from driving the flame onto the plants from only one side. An additional advantage of the present arrangement is that the burner units provide substantial reflection to each other, this reflection being provided partially by the reflector plates 98, 100 referred to above, but also by the flames themselves, each providing substantial heat in counteraction to dissipation of the flame from the opposite side. The flame may be of such intensity and linear extension that it actually touches substantially all points of all the plant stalks but even if that should not be completely effective, the heat from the flames is transmitted into the areas between the plants and with the reflection provided by the reflector plates and the flames themselves, the heating and flaming effect is exerted on all points of the plant stalks.

The flaming also may be applied to the plants after having been crushed by the crusher rollers 38, 40. FIG. 11 shows such an arrangement in which the platform is provided posterior to the crusher rollers 38, 40 onto which the plants are deposited upon issuing from the crusher rollers. In this arrangement, a burner unit 108 is provided, having a plurality of burners 44 and a reflector plate 110 disposed over the platform 111 with the burners directed downwardly. The flames impinges directly onto the plants on the platform 110 and have especially good effect in flaming the plant stalks immediately after the latter are crushed and split open.

The mower-conditioner 20 represented in the figures of the drawings also performs a windrowing operation, confining the cut plants toward the middle where they are deposited behind the implement in a windrow. The plants are picked up from such a windrow and notwithstanding the matted or crushed condition of the plants in such windrow, they are cured in a relatively rapid cycle so that they may be gathered and stored in a short interval of time after being cut from their standing condition.

While we have herein disclosed certain preferred forms of the invention, it will be understood that changes may be made therein within the spirit and scope of the appended claims.

What is claimed is:

1. Apparatus for curing plants comprising a vehicle adapted for movement into standing field borne plants, means on the vehicle for cutting the plants, and means on the vehicle, positioned to direct intense heat onto the individual plants in a zone adjacent to the cutting means during movement of the vehicle in the plants to cause said plants to sweat and to inhibit deterioration of nutrients in the plants, and wherein the heating means includes a reel type burner having a plurality of radially extending burners and mounted at the front of the vehicle for rotation on a transverse axis, said burners extending downwardly into and between the standing plants to a position adjacent the ground and the individual elements having a plurality of burner jets adjacent the radially outer ends thereof and throughout a substantial range radially inwardly therefrom.

2. Apparatus for curing plants according to claim 1 and including means for shutting off the burners when they are in the upper portion of the reel during the normal continuous rotation of the reel.

3. Apparatus for curing plants according to claim 2 and including means for rotating the reel in such direction and at such speed that the lower burners move rearwardly substantially at the same rate as the forward linear speed of the vehicle.

4. Apparatus for curing plants comprising an ambulatory support, means thereon for cutting the plants, means for crushing the cut plants, means for moving the cut plants from the cutting means to the crushing means, said crushing means comprising a pair of crushing rollers at least one of which is hollow and comprises jets extending through the periphery thereof, and means for conducting intense flame through the jets to impinge against plants passing between the rollers.

5. Apparatus for curing plants according to claim 4 wherein both of the crusher rolls constitute burner means and each includes an outer cylindrical wall with jets therethrough and both are operative for conducting flame through the jets into the plants passing between the rolls, and further wherein means is provided for shutting off the jets in certain portions of the rolls.

References Cited
UNITED STATES PATENTS

| | | | |
|---|---|---|---|
| 2,639,553 | 5/1953 | Russell | 47—58 |
| 2,698,170 | 12/1954 | Foley | 56—1 XR |
| 1,799,035 | 3/1931 | Benien et al. | 47—1.44 |
| 2,465,070 | 3/1949 | Demuth | 56—20 |
| 2,587,873 | 3/1952 | McNeill | 47—1.44 |
| 2,756,554 | 7/1956 | Diehl et al. | 56—1 |
| 2,806,337 | 9/1957 | Rezabek | 56—1 |
| 2,909,881 | 10/1959 | Callahan | 56—1 |
| 3,397,520 | 8/1968 | Johnston et al. | 56—23 XR |

ANTONIO F. GUIDA, Primary Examiner

U.S. Cl. X.R.

47—58; 56—1, 20